(12) United States Patent
Gollier et al.

(10) Patent No.: US 10,429,647 B2
(45) Date of Patent: Oct. 1, 2019

(54) FOCUS ADJUSTING VIRTUAL REALITY HEADSET

(71) Applicant: Facebook Technologies, LLC, Menlo Park, CA (US)

(72) Inventors: Jacques Gollier, Redmond, WA (US); Stephen James McNally, Woodinville, WA (US); Ying Geng, Redmond, WA (US); Brian Wheelwright, Sammamish, WA (US); Douglas Robert Lanman, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 483 days.

(21) Appl. No.: 15/179,883

(22) Filed: Jun. 10, 2016

(65) Prior Publication Data

US 2017/0358136 A1    Dec. 14, 2017

(51) Int. Cl.
*G02B 27/01* (2006.01)
*G06F 3/01* (2006.01)
*G06F 1/16* (2006.01)

(52) U.S. Cl.
CPC ......... *G02B 27/0172* (2013.01); *G06F 1/163* (2013.01); *G06F 3/011* (2013.01); *G06F 3/013* (2013.01); *G02B 2027/011* (2013.01); *G02B 2027/0187* (2013.01)

(58) Field of Classification Search
None
See application file for complete search history.

(56) References Cited

U.S. PATENT DOCUMENTS

| 5,768,443 A | 6/1998 | Michael et al. |
| 5,801,885 A * | 9/1998 | Togino ............... G02B 27/0172 359/630 |
| 5,892,570 A | 4/1999 | Stevens |

(Continued)

FOREIGN PATENT DOCUMENTS

| JP | H0764013 A | 3/1995 |
| JP | 3298081 B2 | 7/2002 |

(Continued)

OTHER PUBLICATIONS

European Extended Search Report, European Application No. 16161315.3, dated Aug. 2, 2016, 10 pages.

(Continued)

*Primary Examiner* — Darryl J Collins
*Assistant Examiner* — Journey F Sumlar
(74) *Attorney, Agent, or Firm* — Fenwick & West LLP

(57) ABSTRACT

A virtual scene presented on a display of a virtual reality headset can be adjusted using a varifocal element by changing the shape of one or more optical elements of a pancake lens block, by varying the distance between the two optical elements, or both, based on where in a virtual scene a user is looking. The headset tracks a user's eyes to determine a vergence depth from gaze lines in order to accommodate the user's eye for the determined vergence depth. Accordingly, the shape of one or more optical elements is adjusted, the distance between the two optical elements, or both, is changed to focus light from the display of the virtual reality headset at the vergence depth to keep the user's eye in a zone of comfort as vergence and accommodation change.

20 Claims, 11 Drawing Sheets

(56) References Cited

U.S. PATENT DOCUMENTS

| | | | |
|---|---|---|---|
| 9,915,824 B2 | 3/2018 | Schowengerdt et al. | |
| 9,939,643 B2 | 4/2018 | Schowengerdt | |
| 2001/0017687 A1 | 8/2001 | Rodriguez et al. | |
| 2006/0210111 A1 | 9/2006 | Cleveland et al. | |
| 2007/0183293 A1 | 8/2007 | Murata et al. | |
| 2008/0062164 A1 | 3/2008 | Bassi et al. | |
| 2010/0141852 A1 | 6/2010 | Jurik et al. | |
| 2010/0177163 A1 | 7/2010 | Yang et al. | |
| 2011/0075257 A1 | 3/2011 | Hua et al. | |
| 2012/0249797 A1 | 10/2012 | Haddick et al. | |
| 2013/0050070 A1 | 2/2013 | Lewis et al. | |
| 2013/0176533 A1 | 7/2013 | Raffle et al. | |
| 2013/0314793 A1 | 11/2013 | Robbins et al. | |
| 2014/0092139 A1 | 4/2014 | Sullivan et al. | |
| 2014/0153102 A1 | 6/2014 | Chang | |
| 2014/0177063 A1 | 6/2014 | Wang et al. | |
| 2014/0211193 A1 | 7/2014 | Bloom et al. | |
| 2014/0368793 A1 | 12/2014 | Friedman et al. | |
| 2015/0062558 A1 | 3/2015 | Koppal et al. | |
| 2015/0102981 A1 | 4/2015 | Lee et al. | |
| 2015/0181096 A1 | 6/2015 | Kasai et al. | |
| 2015/0212326 A1 | 7/2015 | Kress et al. | |
| 2015/0222883 A1 | 8/2015 | Welch | |
| 2015/0237336 A1 | 8/2015 | Sylvan et al. | |
| 2015/0286070 A1 | 10/2015 | Aikawa | |
| 2015/0288944 A1 | 10/2015 | Nistico et al. | |
| 2015/0312560 A1 | 10/2015 | Deering et al. | |
| 2015/0346495 A1 | 12/2015 | Welch et al. | |
| 2016/0005179 A1 | 1/2016 | Petyushko et al. | |
| 2016/0091720 A1 | 3/2016 | Stafford et al. | |
| 2016/0103419 A1 | 4/2016 | Callagy et al. | |
| 2016/0219269 A1 | 7/2016 | Tekolste | |
| 2016/0295178 A1 | 10/2016 | Damberg et al. | |
| 2016/0371886 A1 | 12/2016 | Thompson et al. | |
| 2017/0161951 A1* | 6/2017 | Fix | G09G 5/00 |
| 2017/0213388 A1 | 7/2017 | Margolis et al. | |
| 2017/0299869 A1 | 10/2017 | Urey et al. | |
| 2018/0133593 A1 | 5/2018 | Wilson | |

FOREIGN PATENT DOCUMENTS

| | | |
|---|---|---|
| JP | 2014-219621 A | 11/2014 |
| KR | 10-2013-0011692 A | 1/2013 |
| KR | 10-2014-0144510 A | 12/2014 |
| WO | WO 2013/140697 | 3/2012 |
| WO | WO 2015/184412 A1 | 12/2015 |

OTHER PUBLICATIONS

Robinett, W., "Computational Model for the Stereoscopic Optics of a Head-Mounted Display," Proceedings of SPIE Stereoscopic Displays and Applications II, Jan. 1991, pp. 140-160, vol. 1457.

State, A. et al., "Dynamic Virtual Convergence for Video See-Through Head-Mounted Displays: Maintaining Maximum Stereo Overlap Throughout a Close-Range Work Space," IEEE and ACM International Symposium on New Augmented Reality, Oct. 29-30, 2001, pp. 137-146.

Machine translated JP2014-219521; Date of publication: Nov. 20, 2014.

PCT International Search Report and Written Opinion, PCT Application No. PCT/US2017/012346, dated Mar. 30, 2017, 13 pages.

PCT International Search Report and Written Opinion, PCT Application No. PCT/US2016/059938, dated Dec. 20, 2016, 12 pages.

PCT International Search Report and Written Opinion, PCT Application No. PCT/US2016/017397, dated Aug. 16, 2016, 21 pages.

U.S. Appl. No. 15/407,701, filed Jan. 17, 2017, Inventors Nicholas Daniel Trail et al.

U.S. Appl. No. 14/963,126, filed Dec. 8, 2015, Inventors Douglas Robert Lanman et al.

U.S. Appl. No. 15/366,412, filed Dec. 1, 2016, Inventor Nicholas Daniel Trail.

U.S. Appl. No. 14/963,109, filed Dec. 8, 2015, Inventors Douglas Robert Lanman et al.

Japan Patent Office, Office Action, Japanese Patent Application No. 2018-528282, dated Dec. 11, 2018, six pages.

United States Office Action, U.S. Appl. No. 15/456,388, dated Feb. 20, 2019, 29 pages.

* cited by examiner (Real World)

(3D Display)

US 10,429,647 B2

FOCUS ADJUSTING VIRTUAL REALITY HEADSET

BACKGROUND

The present disclosure generally relates to enhancing images from electronic displays, and specifically to varying the focal length of optics to enhance the images.

Virtual reality (VR) headset can be used to simulate virtual environments. For example, stereoscopic images can be displayed on an electronic display inside the headset to simulate the illusion of depth and head tracking sensors can be used to estimate what portion of the virtual environment is being viewed by the user. Such a simulation, however, can cause visual fatigue and nausea resulting from an inability of existing headsets to correctly render or otherwise compensate for vergence and accommodation conflicts.

SUMMARY

A pancake lens block for a virtual reality headset includes a back curved optical element and a front smaller curved optical element in optical series. The back optical element includes a surface that is partially reflective to allow a portion of light from the display screen to travel through the back optical element, while another portion of light is reflected. The front optical element includes a polarized reflector that reflects light waves with electric fields oriented perpendicular to a polarization direction of the polarized reflector and allows light waves with electric fields parallel to the polarization direction to travel through. The pancake lens block additionally includes one or more waveplates or other optical elements with the back curved optical element and the front curved optical element that alter the polarization state of light waves travelling through the waveplates.

The back optical element and the front optical element of the pancake lens block can allow for a range of optical powers (or focal lengths) to be provided in a virtual reality headset. Focus may be adjusted by, for example, applying a force to an edge of one or more optical elements (e.g., a back optical element in the pancake lens block) that changes a shape of the optical element, by adjusting a distance between the back optical element and the front optical element, or some combination thereof. Accordingly, a pancake lens block that includes a back optical element and a front optical element can be used to automatically adjust the focus provide by a virtual reality headset based on a location within a virtual scene presented by the virtual reality headset that the user views.

For example, a three-dimensional (3D) virtual scene is presented on an display screen (e.g., a screen) of the virtual reality headset and a focal length of the pancake lens block that directs image light from the display screen towards eyes of the user is adjusted using a varifocal element to change the shape of one or more optical elements of the pancake lens block or by changing the distance between the optical elements based on a location or object within the virtual scene where the user is looking. The virtual reality headset may track a user's eyes to approximate gaze lines and determine a gaze point including a vergence depth (an estimated point of intersection of the gaze lines) to determine an appropriate amount of accommodation to provide the user. The gaze point identifies an object or plane of focus for a particular frame of the virtual scene and the varifocal element adjusts the focal length of the pancake lens block to focus the pancake lens block at the vergence depth to keep the user's eyes in a zone of comfort as vergence and accommodation change.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1A:
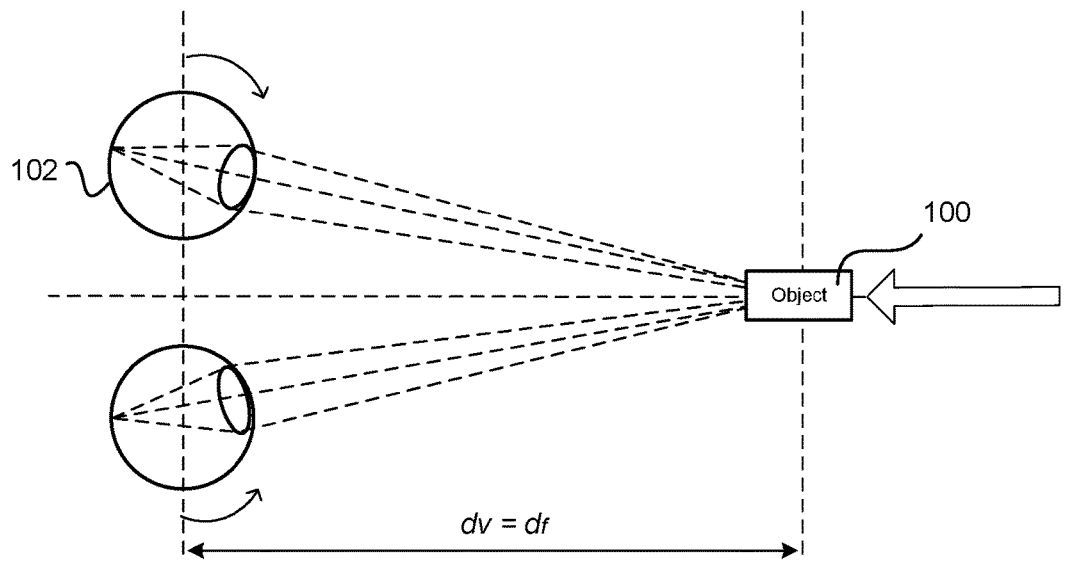
FIG. 1A shows the relationship between vergence and eye focal length in the real world.

Vergence-accommodation conflict is a problem in many virtual reality systems. Vergence is the simultaneous movement or rotation of both eyes in opposite directions to obtain or maintain single binocular vision and is connected to accommodation of the eye. Under normal conditions, when human eyes looks at a new object at a distance different from an object they had been looking at, the eyes automatically change focus (by changing their shape) to provide accommodation at the new distance or vergence depth of the new object. FIG. 1A shows an example of how the human eye experiences vergence and accommodation in the real world. In the example of FIG. 1A, the user is looking at real object 100A (i.e., the user's eyes are verged on real object 100 and gaze lines from the user's eyes intersect at real object 100.). As real object 100 is moved closer to the user, as indicated by the arrow in FIG. 1A, each eye 102 rotates inward (i.e., convergence) to stay verged on real object 100A. As real object 100 gets closer, eye 102 must "accommodate" for the closer distance by changing its shape to reduce the power or focal length. Thus, under normal conditions in the real world, the vergence depth ($d_v$) equals the focal length ($d_f$).

Figure 1B:
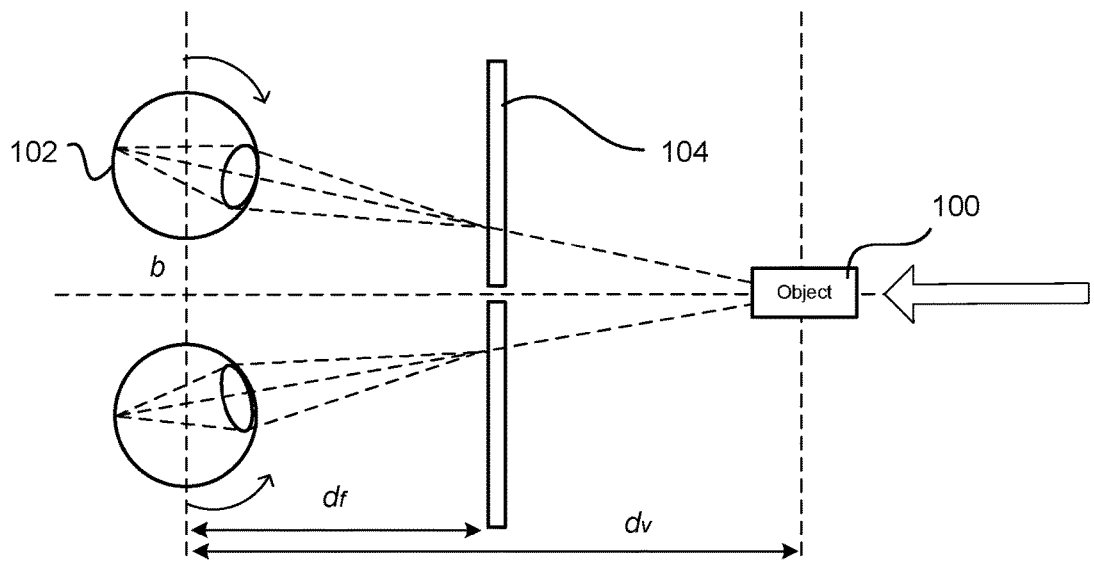
FIG. 1B shows the conflict between vergence and eye focal length in a three-dimensional display screen.

FIG. 1B shows an example conflict between vergence and accommodation that can occur with some three-dimensional displays. In this example, a user is looking at virtual object 100B displayed on 3D electronic screen 104; however, the user's eyes are verged on and gaze lines from the user's eyes intersect at virtual object 100B, which is a greater distance from the user's eyes than 3D electronic screen 104. As virtual object 100B is rendered on 3D electronic display 104 to appear closer to the user, each eye 102 again rotates inward to stay verged on virtual object 100B, but the power or focal length of each eye is not reduced; hence, the user's eyes do not accommodate as in FIG. 1A. Thus, instead of reducing power or focal length to accommodate for the closer vergence depth, eye 102 maintains accommodation at a distance associated with 3D electronic display 104. Thus, the vergence depth ($d_v$) often does not equal the focal length ($d_f$) for the human eye for objects displayed on 3D electronic displays. This discrepancy between vergence depth and focal length is referred to as "vergence-accommodation conflict." A user experiencing only vergence or accommodation and not both will eventually experience some degree of fatigue and nausea, which is undesirable for virtual reality system creators.

Figure 2:
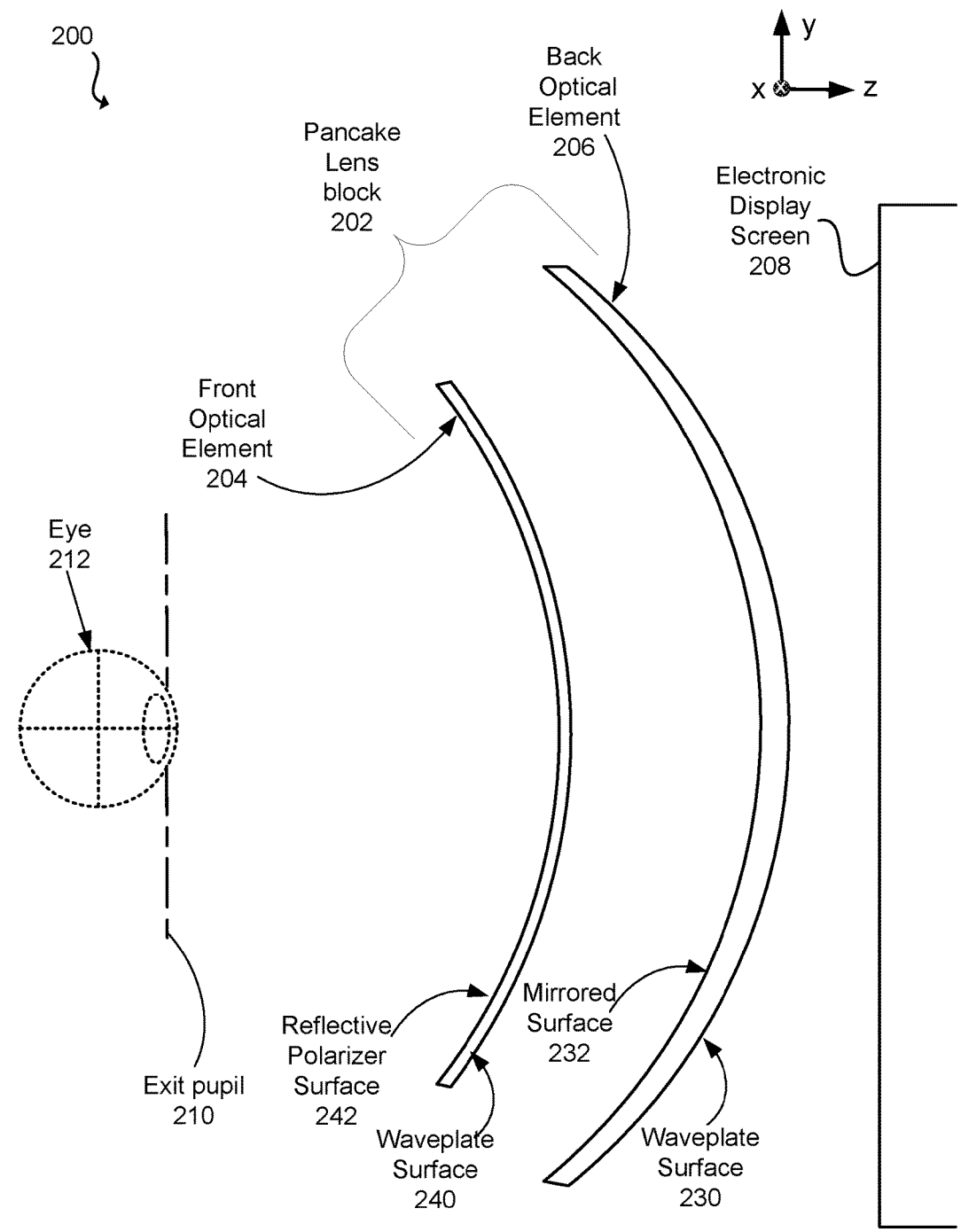
FIG. 2 is an example pancake lens block, in accordance with one embodiment.

FIG. 2 is a cross section 200 of an embodiment of pancake lens block 202, in accordance with an embodiment. In some embodiments, the pancake lens block 202 is part of a head mounted display (HMD) and includes front optical element 204 and back optical element 206 that focuses light from electronic display screen 208 to exit pupil 210 where a user's eye 212 is positioned. For purposes of illustration, FIG. 2 shows a cross section 200 of pancake lens block 202 associated with a single eye 212, but another pancake display assembly, separate from the pancake lens block shown in FIG. 2, can provide altered image light to another eye of the user. Some embodiments of the pancake display assembly have different components than those described here. Similarly, in some cases, functions can be distributed among the components in a different manner than is described here.

Light emitted from electronic display 208 is linearly polarized. In some embodiments, electronic display 208 includes one or more linear polarizers that linearly polarizers light emitted from electronic display 208. Alternatively, light emitted from light emitting components (e.g., LEDs) is emitted as linearly polarized light.

Pancake lens block 202 includes front optical element 204 and back optical element 206. One or more surfaces of front optical element 204 and back optical element 206 are shaped to correct for field curvature. One or more surfaces of front optical element 204 may be shaped to be spherically concave (e.g., a portion of a sphere), spherically convex, a rotationally symmetric asphere, a freeform shape, or some other shape that mitigates field curvature. In some embodiments, the shape of one or more surfaces of front optical element 204 and back optical element 206 are designed to additionally correct for other forms of optical aberration. In some embodiments, one or more of the optical elements within pancake lens block 202 may have one or more coatings, such as anti-reflective coatings, to reduce ghost images and enhance contrast.

Back optical element 206 includes waveplate surface 230 and mirrored surface 232. In this example, waveplate surface 230 is a quarter-waveplate that shifts polarization of received light. A quarter-waveplate includes a polarization axis and waveplate surface 230 shifts the polarization axis 45 degrees relative to incident linearly polarized light such that waveplate surface 230 converts linearly polarized light into circularly polarized light. Likewise, a quarter-waveplate converts circularly polarized light to linearly polarized light. Quarter-waveplates are usually made of birefringent materials such as quartz, organic material sheets, or liquid crystal. In one embodiment, the quarter-waveplates are designed to be optimized such that the dependence of the retardance induced by the plate remains close to a quarter of a wave independently of the wavelength and the angle of incidence. This usually requires the use of so called "zero order waveplate." Mirrored surface 232 is partially reflective to reflect a portion of the received light. In some embodiments, mirrored surface 232 is configured to transmit 50% of incident light and reflect 50% of incident light.

Front optical element 204 includes waveplate surface 240 and reflective polarizer surface 242. Waveplate surface 240 is also a quarter-waveplate and reflective polarizer surface 242 is a partially reflective mirror configured to reflect received light of a first linear polarization and transmit received light of a second linear polarization. For example, reflective polarizer surface 242 may be configured to reflect linearly polarized light with a polarization direction in the x direction, and pass light that is linearly polarized in the y direction.

Pancake lens block 202 mitigates field curvature and accordingly acts to reduce pupil swim. Field curvature is an optical aberration that causes a flat object to appear sharp only in a certain part(s) of the frame, instead of being uniformly sharp across the frame. More generally, field curvature is a result of a focal distance of an optics system not perfectly aligning with all the points on a focal plane. Pupil swim is the effect caused by changes in the location of a user's eye within an eyebox results in distortions in the content being presented to the user. Correcting for field curvature mitigates pupil swim. The pancake display assembly mitigates field curvature in an image that is output to a user's eyes to reduce pupil swim. Additionally, pancake lens block 202 has a small form factor, is relatively low weight compared to other optical systems designed to remove field curvature and is configured to have a wide field of view. The operation of pancake lens block 202 is discussed below with regard to FIG. 3.

Figure 3:
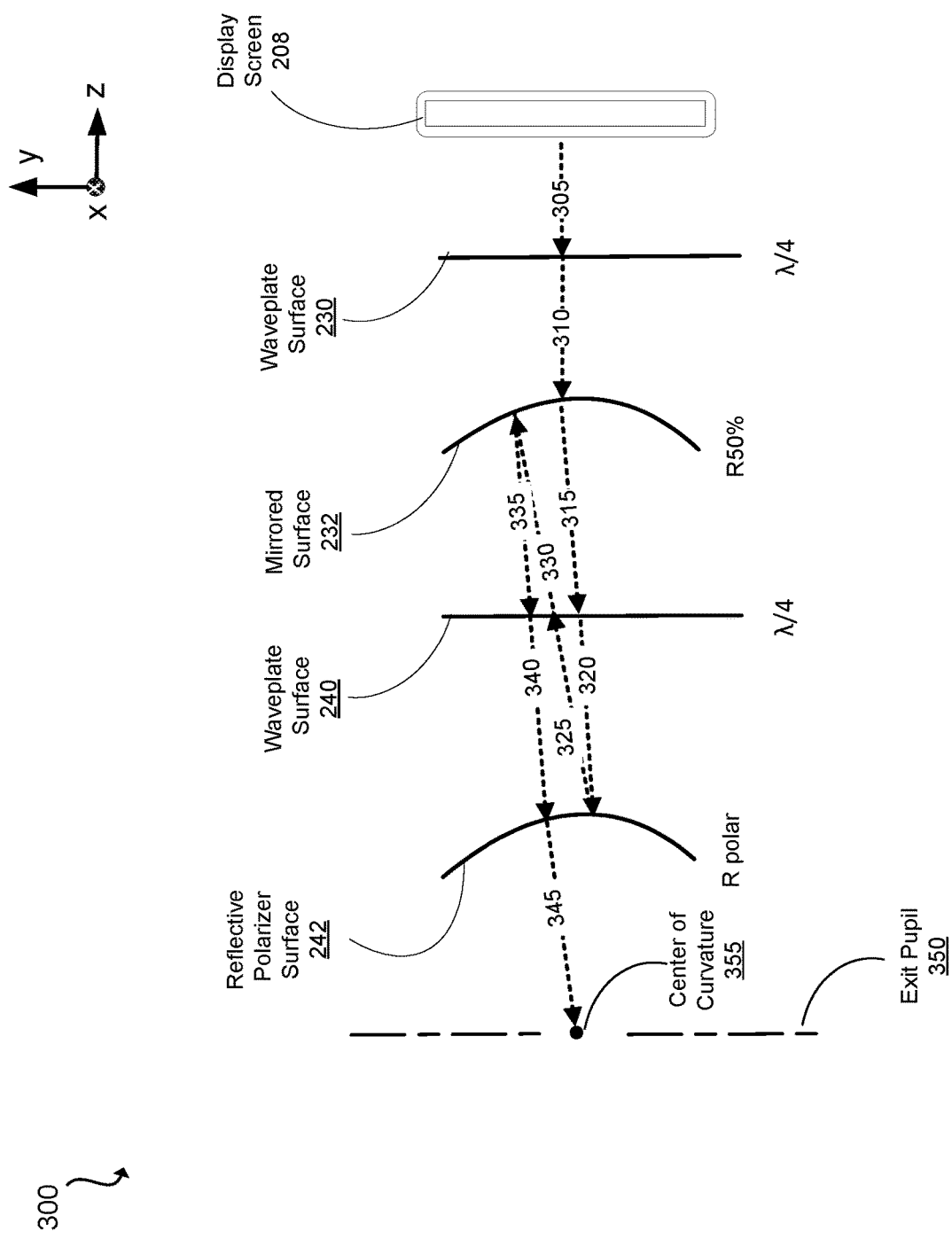
FIG. 3 shows example light transmission and reflection happening in the pancake lens block shown in FIG. 2, in accordance with one embodiment.

FIG. 3 shows example light propagation in pancake lens block 202 shown in FIG. 2, in accordance with one embodiment. Light 305 from electronic display screen 208 is linearly polarized. Waveplate surface 230 (quarter-waveplate) has an axis 45 degrees (or 90 degrees) relative to the y direction (which is the direction of polarization of light 305). The orientation of the waveplate axis relative to the incident linearly polarized light controls the handedness of the emitted circularly polarized light. Waveplate surface 230 changes the polarization of light 305 from linear polarization to circular polarization—shown as light 310. The polarization of light 310 may be clockwise or anti-clockwise based on the orientation of the axis of waveplate surface 230 relative to incident linearly polarized light. A first portion of light 310 is reflected by mirrored surface 232, and a second portion of light 315 is transmitted by mirrored surface 232 towards waveplate surface 240. In some embodiments, mirrored surface 232 is configured to reflect 50% of incident light (e.g., the light 310). Similarly, waveplate surface 240 is a quarter-waveplate and changes the polarization of light 315 from circular to linear (referred to as light 320).

Light 320 is incident on reflective polarizer surface 242, which reflects light that is polarized in a blocking direction (e.g., x direction) and transmits light that is polarized in a perpendicular direction (e.g., y direction). At this point, light 320 is linearly polarized in the blocking direction. Thus, reflective polarizer surface 242 reflects light 320 and the reflected light is referred to as light 325. Waveplate surface 240 changes the linear polarized light 325 to circularly polarized light 330 and mirrored surface 232 reflects a portion of the polarized light 330, as described above. The reflected portion of light 330 is referred to as light 335.

Light 335 is also circularly polarized; however, its handedness is opposite that of light 330 and 315 due to the reflection from mirrored surface 232. Thus, waveplate surface 240 changes the polarization of circularly polarized light 235 to linearly polarized light 340. However, as the handedness of the light 435 is opposite to that of light 315, the polarization of light 340 is perpendicular to that of light 320. Accordingly, light 340 is linearly polarized in a direction (e.g., y) perpendicular to the blocking direction (e.g., x) and is therefore transmitted by reflective polarizer surface 242 as light 345 to exit pupil 350.

Light propagating through pancake lens block 202, thus, undergoes multiple reflections between back optical element 206 and front optical element 204 and passes through multiple materials (i.e., waveplates, reflectors, glass, air, etc.) each having different indices of refraction. These materials can be chosen to allow back optical element 206 and front optical element 204 to compensate each other to remove field curvature. For example, field curvature is minimized by designing the difference surfaces of back optical element 206 and front optical element 204 to have radii and indices or refraction that minimize the Petzval Sum:

$$\sum_i \frac{n_{i+1} - n_1}{r_i n_i + 1 n_i},$$

where r is the radius of the i$^{th}$ surface and the n is the indices of refraction on the first and second side of each optical element. Further, minimizing the distance between center of curvature 355 (which may or may not be the same for both optical elements) and a user's pupils minimizes the distortion caused by field curvature. Thus, in some embodiments, the center of curvature 355 is positioned as near as reasonably possible to the pupils of a user's eyes (e.g., at the exit pupil 350).

Figure 4A:
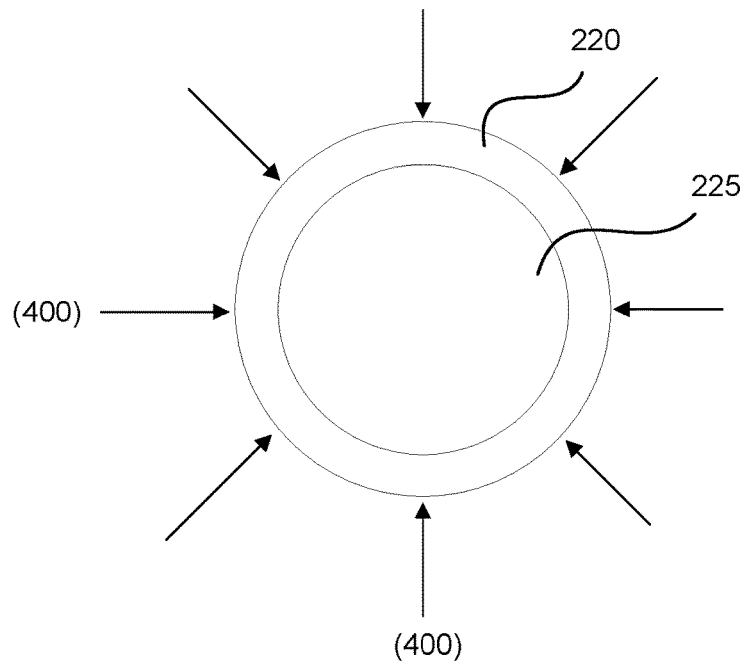
FIG. 4A shows an example force being applied to a curved optical element to adjust focus of a pancake lens block, in accordance with at least one embodiment.

Further, pancake lens block 202 can allow for a dynamic range of optical powers (or focal lengths) to be provided in a virtual reality headset by, for example, making relatively small adjustments to back optical element 206 and/or front optical element 204. For example, such adjustments can include changing the shape of back optical element 206 or front optical element 204, changing the shape of back optical element 206 and front optical element 204 in concert, changing the distance between back optical element 206 and front optical element 204, or a combination of changing the shape of the optical elements and the distance between them. In one embodiment, front optical element 204 and back optical element 206 are thin plastic molded meniscus optical elements that are deformable when a force is applied from an edge, for example, to adjust the focal length of pancake lens block 202. Accordingly, FIG. 4A shows an example force 400 being applied to back optical element 206 to adjust focus of pancake lens block 202, in accordance with at least one embodiment. In this example, the force is rotationally symmetric and radially inward to uniformly change the radius of curvature. Thus, a rotationally symmetric force can be applied to one of the two optical elements, changing the shape of the optical element (i.e., the radius of curvature) and, thereby, causing light to focus in a different location (i.e., adjusting the focal length) relative to when no force is applied.

Figure 4B:
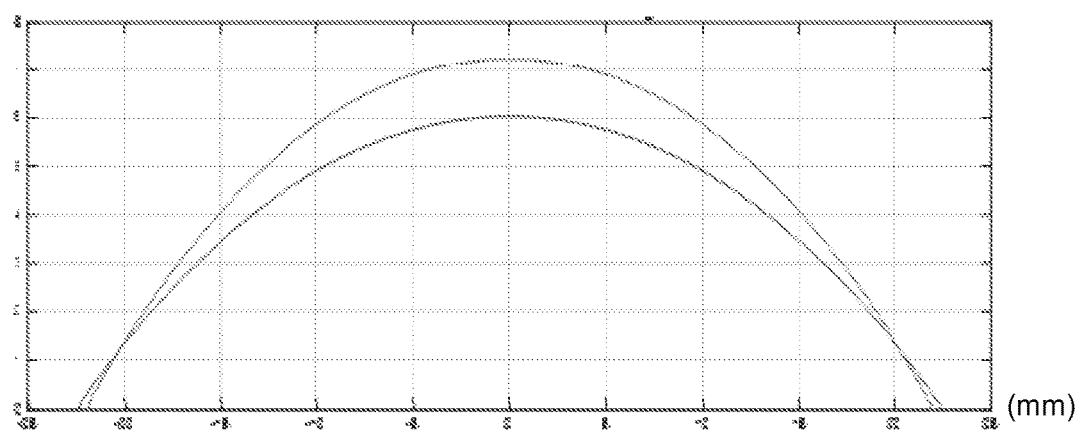
FIG. 4B is an example plot showing the expected change in optical element shape when a force is applied, in accordance with at least one embodiment.

FIG. 4B is an example plot showing the expected change in optical element shape when a force is applied to an example optical element, in one embodiment. In this example, the example optical element has an unloaded radius of 22.5 mm and a diameter of 45 mm and a force is applied that changes or narrows the diameter by 1 mm. The 1 mm diameter change results in a radius of curvature change from 45 mm to about 37 mm, which is a change in radius of curvature over change in diameter or amplification of about 8 times. Thus, small changes to the diameter result in relatively large changes in focal length. This is advantageous compared to a focal length of a convex lens, for example, which would need to be moved to achieve the same amplification factor, where minimizing movement lowers the chance of mechanical breakdown.

Alternatively, pancake lens block 202 can allow for a dynamic range of optical powers (or focal lengths) to be provided in a virtual reality headset by changing the distance between back optical element 206 and front optical element 204. In one embodiment, changing the distance between back optical element 206 and front optical element 204 causes light to focus in a different location, thereby adjusting the focal length.

Figure 5A:
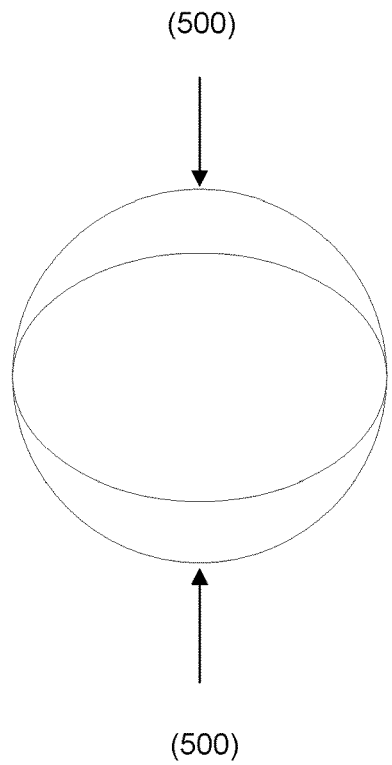
FIGS. 5A and 5B show example processes of astigmatism compensation using a pancake lens block, in accordance with at least one embodiment.
Figure 5B:
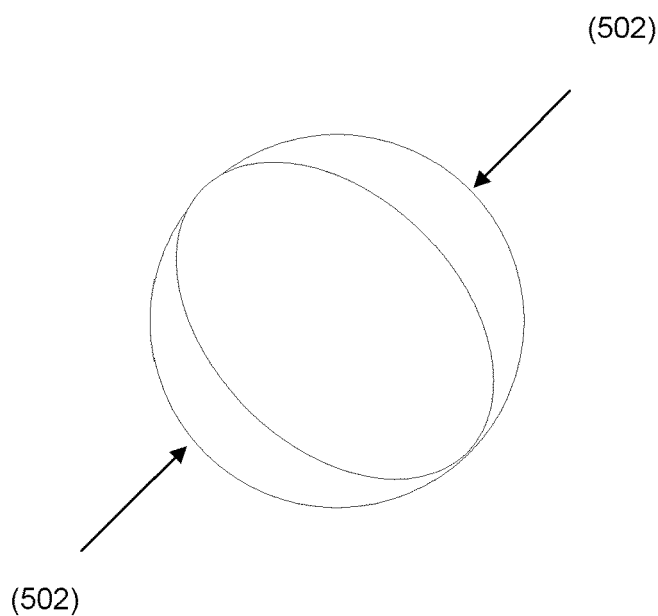

Another potential advantage of pancake lens block 202 is astigmatism compensation of an observer's eye. For example, by applying non-rotationally symmetric forces to the optical element, the radius of curvature is modified in only one direction. FIGS. 5A and 5B show example astigmatism compensation using a pancake lens block that includes two curved optical elements, in accordance with at least one embodiment. FIG. 5A shows forces 500 being applied at 0 degrees and FIG. 5B shows forces 502 being applied at 45 degrees.

System Overview

Figure 6:
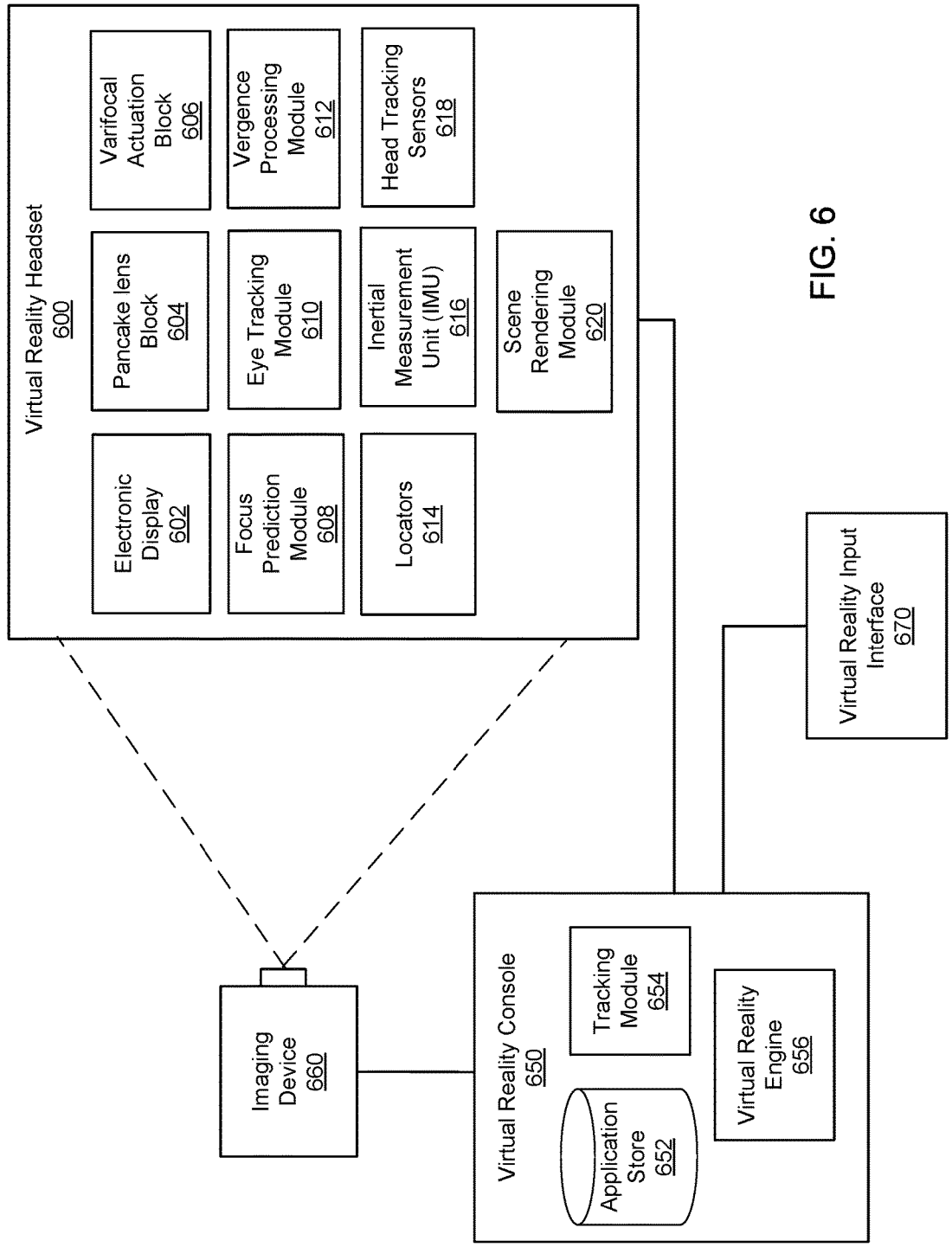
FIG. 6 shows an example virtual reality system, in accordance with at least one embodiment.

FIG. 6 is virtual reality (VR) system environment in which a VR headset 600 with a pancake lens operates. In this example, the VR system environment includes VR headset 600, imaging device 660, and VR input interface 670, which are each coupled to VR console 650. While FIG. 6 shows a single VR headset 600, a single imaging device 660, and a single VR input interface 670, in other embodiments, any number of these components may be included in the system. For example, there may be multiple VR headsets 600 each having an associated VR input interface 670 and being monitored by one or more imaging devices 660, with each VR headset 600, VR input interface 670, and imaging devices 660 communicating with the VR console 650. In alternative configurations, different and/or additional components may also be included in the VR system environment. In some embodiments, VR headset 600 may also or alternatively act as an augmented reality (AR) and/or mixed reality (MR) headset. In these embodiments, the VR headset 105 augments views of a physical, real-world environment with computer-generated elements (e.g., images, video, sound, etc.).

VR headset 600 is a Head-Mounted Display (HMD) that presents content to a user. Example content includes images, video, audio, or some combination thereof. Audio content may be presented via a separate device (e.g., speakers and/or headphones) external to VR headset 600 that receives audio information from VR headset 600, VR console 650, or both. VR headset 600 includes electronic display 602, pancake lens block 604, varifocal actuation block 606, focus prediction module 608, eye tracking module 610, vergence processing module 612, one or more locators 614, internal measurement unit (IMU) 616, head tracking sensors 618, and scene rendering module 620.

Electronic display screen 602 presents visual information (i.e., image light) from an electronic signal. The electronic display screen 602 may be, e.g., a liquid crystal display (LCD), an organic light emitting diode (OLED) display, an active-matrix organic light-emitting diode display (AMO-LED), some type of flexible display, or some combination thereof. In some embodiments, electronic display screen 208 includes a linear polarizer or admits light that is linearly polarized. In some embodiments, the electronic display screen 602 may be, e.g., the electronic display screen 208.

Pancake lens block 604 directs light from electronic display 602 to an exit pupil for viewing by a user using one or more optical elements in addition to the two curved optical elements described in FIGS. 2-3. For example, the one or more optical elements may include apertures, Fresnel lenses, convex lenses, concave lenses, filters, and so forth, and may include combinations of different optical elements. In some embodiments, one or more of the optical elements of pancake lens block 604 may have one or more coatings, such as anti-reflective coatings. Magnification of the image light by pancake lens block 604 allows electronic display 602 to be physically smaller, weigh less, and consume less power than larger displays. Additionally, magnification of the image light may increase a field of view of the displayed content. For example, the field of view of the displayed content is such that the displayed content is presented using almost all (e.g., 150 degrees diagonal), and in some cases all, of the user's field of view.

Varifocal actuation block 606 includes a varifocal element that causes pancake lens block 604 to vary the focal length (or optical power) of VR headset 600 to keep a user's eyes in a zone of comfort as vergence and accommodation change. In one embodiment, varifocal actuation block 606 physically changes the distance between the two optical elements of pancake lens block 604. Alternatively, varifocal actuation block 606 changes the focal length of pancake lens block 604 by applying a force to one of the back optical element 206 or the front optical element 204 described in FIGS. 2A-2B. Thus, varifocal actuation block 606 may include actuators, motors, vacuum pressure, and so forth that change the shape of at least one optical element of optical block 604.

Each state of pancake lens block 604 corresponds to a focal length of VR headset 600 or to a combination of the focal length and eye position relative to pancake lens block 604 (as discussed further below). Any number of states could be provided; however, a limited number of states accommodate the sensitivity of the human eye, allowing some embodiments to include fewer focal lengths. Varifocal actuation block 606, thus, sets and changes the state of pancake lens block 604 to achieve a desired focal length.

Focus prediction module 608 is an encoder including logic that tracks the state of pancake lens block 604 to predict to one or more future states of pancake lens block 604. For example, focus prediction module 608 accumulates historical information corresponding to previous states of pancake lens block 604 and predicts a future state of pancake lens block 604 based on the previous states. Because rendering of a virtual scene by VR headset 600 is adjusted based on the state of pancake lens block 604, the predicted state allows scene rendering module 620, further described below, to determine an adjustment to apply to the virtual scene for a particular frame. Accordingly, focus prediction module 608 communicates information describing a predicted state of pancake lens block 604 for a frame to scene rendering module 620. Adjustments for the different states of pancake lens block 604 performed by scene rendering module 620 are further described below.

Eye tracking module 610 tracks an eye position and eye movement of a user of VR headset 600. A camera or other optical sensor inside VR headset 600 captures image information of a user's eyes, and eye tracking module 610 uses the captured information to determine interpupillary distance, interocular distance, a three-dimensional (3D) position of each eye relative to VR headset 600 (e.g., for distortion adjustment purposes), including a magnitude of torsion and rotation (i.e., roll, pitch, and yaw) and gaze directions for each eye. In one example, infrared light is emitted within VR headset 600 and reflected from each eye. The reflected light is received or detected by the camera and analyzed to extract eye rotation from changes in the infrared light reflected by each eye. Many methods for tracking the eyes of a user can be used by eye tracking module 610. Accordingly, eye tracking module 610 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, eye tracking module 610 integrates information from past measurements, measurements identifying a position of a user's head, and 3D information describing a scene presented by display screen 602. Thus, information for the position and orientation of the user's eyes is used to determine the gaze point in a virtual scene presented by VR headset 600 where the user is looking.

Vergence processing module 612 determines a vergence depth of a user's gaze based on the gaze point or an estimated intersection of the gaze lines determined by eye tracking module 610. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, vergence processing module 612 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

Locators 614 are objects located in specific positions on VR headset 600 relative to one another and relative to a specific reference point on VR headset 600. Locator 614 may be a light emitting diode (LED), a corner cube reflector, a reflective marker, a type of light source that contrasts with an environment in which VR headset 600 operates, or some combination thereof. Active locators 614 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

Locators 614 can be located beneath an outer surface of VR headset 600, which is transparent to the wavelengths of light emitted or reflected by locators 614 or is thin enough not to substantially attenuate the wavelengths of light emitted or reflected by locators 614. Further, the outer surface or other portions of VR headset 600 can be opaque in the visible band of wavelengths of light. Thus, locators 614 may emit light in the IR band while under an outer surface of VR headset 600 that is transparent in the IR band but opaque in the visible band.

IMU 616 is an electronic device that generates fast calibration data based on measurement signals received from one or more of head tracking sensors 618, which generate one or more measurement signals in response to motion of VR headset 600. Examples of head tracking sensors 618 include accelerometers, gyroscopes, magnetometers, other sensors suitable for detecting motion, correcting error associated with IMU 616, or some combination thereof. Head tracking sensors 618 may be located external to IMU 616, internal to IMU 616, or some combination thereof.

Based on the measurement signals from head tracking sensors 618, IMU 616 generates fast calibration data indicating an estimated position of VR headset 600 relative to an initial position of VR headset 600. For example, head tracking sensors 618 include multiple accelerometers to measure translational motion (forward/back, up/down, left/right) and multiple gyroscopes to measure rotational motion (e.g., pitch, yaw, and roll). IMU 616 can, for example, rapidly sample the measurement signals and calculate the estimated position of VR headset 600 from the sampled data. For example, IMU 616 integrates measurement signals received from the accelerometers over time to estimate a velocity vector and integrates the velocity vector over time to determine an estimated position of a reference point on VR headset 600. The reference point is a point that may be used to describe the position of VR headset 600. While the reference point may generally be defined as a point in space, in various embodiments, reference point is defined as a point within VR headset 600 (e.g., a center of the IMU 630). Alternatively, IMU 616 provides the sampled measurement signals to VR console 650, which determines the fast calibration data.

IMU 616 can additionally receive one or more calibration parameters from VR console 650. As further discussed below, the one or more calibration parameters are used to maintain tracking of VR headset 600. Based on a received calibration parameter, IMU 616 may adjust one or more IMU parameters (e.g., sample rate). In some embodiments, certain calibration parameters cause IMU 616 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

Scene render module 620 receives content for the virtual scene from VR engine 656 and provides the content for display on electronic display 602. Additionally, scene render module 620 can adjust the content based on information from focus prediction module 608, vergence processing module 612, IMU 616, and head tracking sensors 618. For example, upon receiving the content from VR engine 656, scene render module 620 adjusts the content based on the predicted state (i.e., eye position and focal length) of pancake lens block 604 received from focus prediction module 608. Additionally, scene render module 620 determines a portion of the content to be displayed on electronic display 602 based on one or more of tracking module 654, head tracking sensors 618, or IMU 616, as described further below.

Imaging device 660 generates slow calibration data in accordance with calibration parameters received from VR console 650. Slow calibration data includes one or more images showing observed positions of locators 614 that are detectable by imaging device 660. Imaging device 660 may include one or more cameras, one or more video cameras, other devices capable of capturing images including one or more locators 614, or some combination thereof. Additionally, imaging device 660 may include one or more filters (e.g., for increasing signal to noise ratio). Imaging device 660 is configured to detect light emitted or reflected from locators 614 in a field of view of imaging device 660. In embodiments where locators 614 include passive elements (e.g., a retroreflector), imaging device 660 may include a light source that illuminates some or all of locators 614, which retro-reflect the light towards the light source in imaging device 660. Slow calibration data is communicated from imaging device 660 to VR console 650, and imaging device 660 receives one or more calibration parameters from VR console 650 to adjust one or more imaging parameters (e.g., focal length, focus, frame rate, ISO, sensor temperature, shutter speed, aperture, etc.).

VR input interface 670 is a device that allows a user to send action requests to VR console 650. An action request is a request to perform a particular action. For example, an action request may be to start or end an application or to perform a particular action within the application. VR input interface 670 may include one or more input devices. Example input devices include a keyboard, a mouse, a game controller, or any other suitable device for receiving action requests and communicating the received action requests to VR console 650. An action request received by VR input interface 670 is communicated to VR console 650, which performs an action corresponding to the action request. In some embodiments, VR input interface 670 may provide haptic feedback to the user in accordance with instructions received from VR console 650. For example, haptic feedback is provided by the VR input interface 670 when an action request is received, or VR console 650 communicates instructions to VR input interface 670 causing VR input interface 670 to generate haptic feedback when VR console 650 performs an action.

VR console 650 provides content to VR headset 600 for presentation to the user in accordance with information received from imaging device 660, VR headset 600, or VR input interface 670. In the example shown in FIG. 6, VR console 650 includes application store 652, tracking module 654, and virtual reality (VR) engine 656. Some embodiments of VR console 650 have different or additional modules than those described in conjunction with FIG. 6. Similarly, the functions further described below may be distributed among components of VR console 650 in a different manner than is described here.

Application store 652 stores one or more applications for execution by VR console 650. An application is a group of instructions, that when executed by a processor, generates content for presentation to the user. Content generated by an application may be in response to inputs received from the user via movement of VR headset 600 or VR interface device 670. Examples of applications include gaming applications, conferencing applications, video playback application, or other suitable applications.

Tracking module 654 calibrates the VR system using one or more calibration parameters and may adjust one or more calibration parameters to reduce error in determining position of VR headset 600. For example, tracking module 654 adjusts the focus of imaging device 660 to obtain a more accurate position for observed locators 614 on VR headset 600. Moreover, calibration performed by tracking module 654 also accounts for information received from IMU 616. Additionally, if tracking of VR headset 600 is lost (e.g., imaging device 660 loses line of sight of at least a threshold number of locators 614), tracking module 654 re-calibrates some or all of the VR system components.

Additionally, tracking module 654 tracks the movement of VR headset 600 using slow calibration information from imaging device 660 and determines positions of a reference point on VR headset 600 using observed locators from the slow calibration information and a model of VR headset 600. Tracking module 654 also determines positions of the reference point on VR headset 600 using position information from the fast calibration information from IMU 616 on VR headset 600. Additionally, tracking module 654 may use portions of the fast calibration information, the slow calibration information, or some combination thereof, to predict a future location of VR headset 600, which is provided to VR engine 656.

VR engine 656 executes applications within the VR system and receives position information, acceleration information, velocity information, predicted future positions, or some combination thereof for VR headset 600 from tracking module 654. Based on the received information, VR engine 656 determines content to provide to VR headset 600 for presentation to the user, such as a virtual scene. For example, if the received information indicates that the user has looked to the left, VR engine 656 generates content for VR headset 600 that optical elements or tracks the user's movement in a virtual environment. Additionally, VR engine 656 performs an action within an application executing on VR console 650 in response to an action request received from the VR input interface 670 and provides feedback to the user that the action was performed. The provided feedback may be visual or audible feedback via VR headset 600 or haptic feedback via VR input interface 670.

Figure 7:
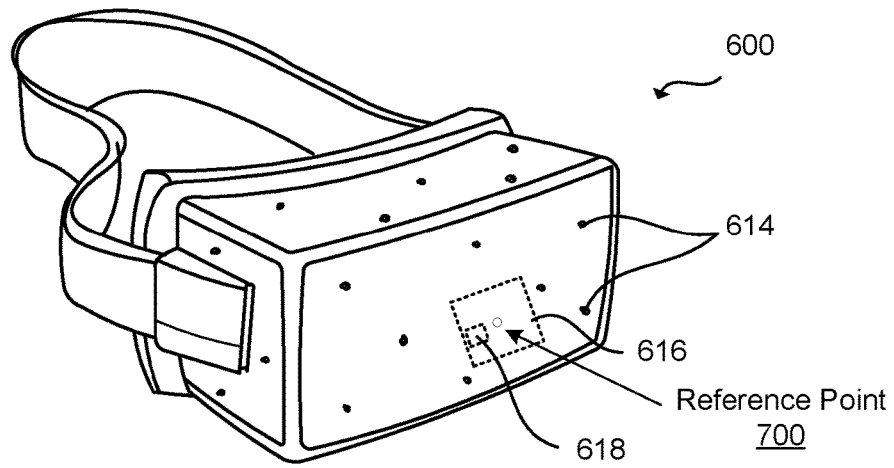
FIG. 7 shows an internal diagram of a virtual reality headset, in accordance with at least one embodiment.

FIG. 7 is a diagram of VR headset 600, in accordance with at least one embodiment. In this example, VR headset 600 includes a front rigid body and a band that goes around a user's head. The front rigid body includes one or more display screens corresponding to electronic display 602, IMU 616, head tracking sensors 618, and locators 614. In this example, head tracking sensors 618 are located within IMU 616.

Locators 614 are located in fixed positions on the front rigid body relative to one another and relative to reference point 200. In this example, reference point 700 is located at the center of IMU 616. Each of locators 614 emits light that is detectable by imaging device 660. Locators 614, or portions of locators 614, are located on a front side, a top side, a bottom side, a right side, and a left side of the front rigid body, as shown FIG. 7.

Focus Adjustment Method

Figure 8:
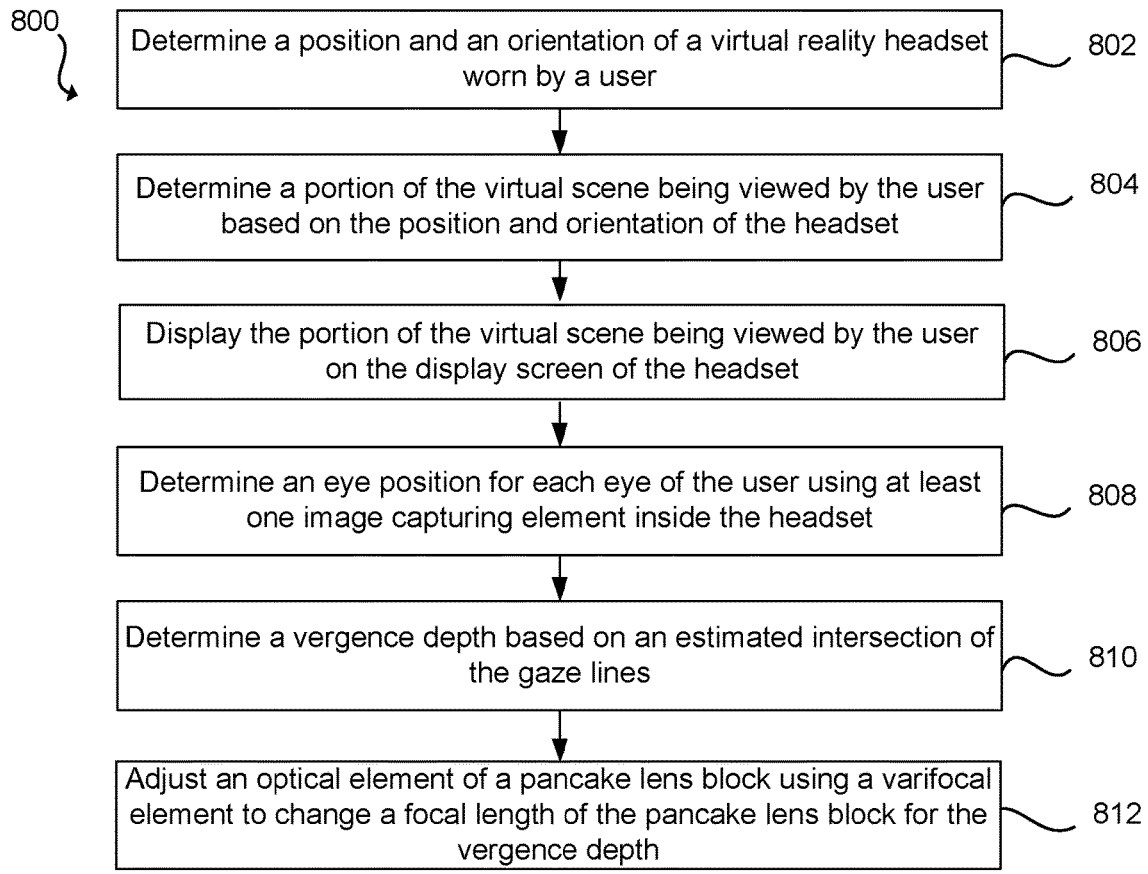
FIG. 8 shows an external diagram of a virtual reality headset, in accordance with at least one embodiment.

FIG. 8 shows an embodiment of a process 800 for mitigating vergence-accommodation conflict by adjusting the focal length of pancake lens block 604 of virtual reality (VR) headset 600. As discussed above, a varifocal system may dynamically vary its focus to bring images presented to a user wearing VR headset 600 into focus, which keeps the user's eyes in a zone of comfort as vergence and accommodation change. Additionally, eye tracking in combination with the variable focus of the varifocal system allows blurring to be introduced as depth cues in images presented by VR headset 600. In one embodiment, the process of FIG. 8 is performed by the VR headset 600. Other entities (e.g., VR console 650) may perform some or all of the steps of the process in other embodiments. Likewise, embodiments may include different and/or additional steps, or perform the steps in different orders.

Accordingly, in the embodiment shown by FIG. 8, a position, an orientation, and/or a movement of VR headset 600 are determined 802 by a combination of locators 614, IMU 616, head tracking sensors 618, imagining device 660, and tracking module 654, as described above in conjunction with FIG. 6. Portions of a virtual scene presented by VR headset 600 are mapped to various positions and orientations of VR headset 600. Thus, a portion of the virtual scene currently viewed by a user is determined 804 based on the position, orientation, and movement of VR headset 600.

The virtual scene corresponding to the portion of the virtual scene being viewed by the user is displayed 806 on electronic display screen 602 with a distortion correction to correct optical error caused by the determined state of pancake lens block 604 and with depth of field blur based on the filtered vergence depth. Further, varifocal actuation block 606 has changed the focus of pancake lens block 604 to provide focus and accommodation to the location in the portion of the virtual scene where the user's eyes are verged. In various embodiments, the process 800 may include additional steps or perform steps in different orders than the order described in conjunction with FIG. 8.

Figure 9:
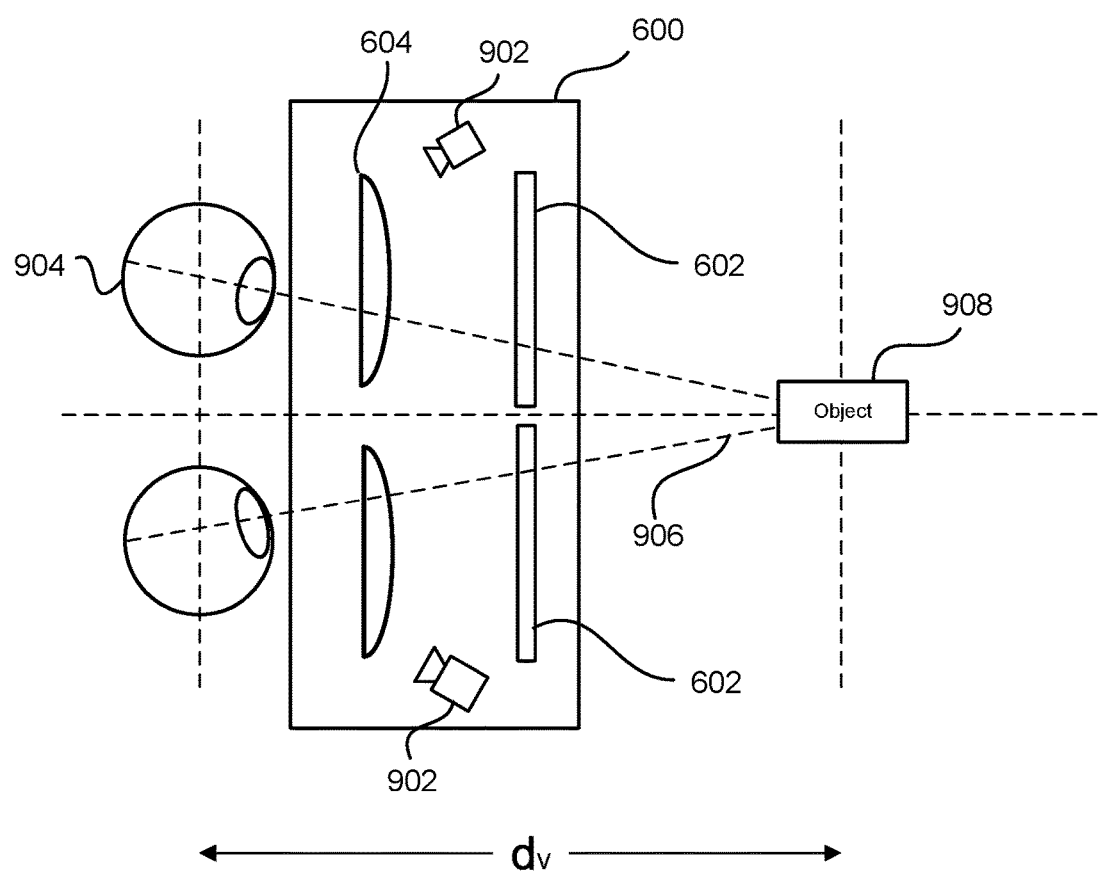
FIG. 9 shows an example process for mitigating vergence-accommodation conflict by adjusting the focal length of a pancake lens block that includes two curved optical elements, in accordance with at least one embodiment.

After determining 804 and displaying 806 the portion of the virtual scene being viewed by the user, the VR system may then determine a location or an object within the determined portion at which the user is looking to adjust focus for that location or object accordingly. To determine the location or object within the determined portion of the virtual scene at which the user is looking, VR headset 600 tracks the position and location of the user's eyes using image information from a camera or other image capturing element, for example. Thus, VR headset 600 determines 808 an eye position for each eye of the user. For example, VR headset 600 tracks at least a subset of the 3D position, roll, pitch, and yaw of each eye and uses these quantities to estimate a 3D gaze point of each eye. Further, information from past eye positions, information describing a position of the user's head, and information describing a scene presented to the user may also be used to estimate the 3D gaze point of an eye in various embodiments. For example, FIG. 9 shows a cross section of an embodiment of VR headset 600 that includes camera 902 for tracking the position of each eye 904, display screen 602, and pancake lens block 604 that includes two curved optical elements, as described with respect to FIGS. 2A and 2B. In this example, camera 902 captures images of the user's eyes looking at object 908 and eye tracking module 610 determines an output for each eye 904 and gaze lines 906 corresponding to the gaze point or location where the user is looking based on the captured images. Accordingly, vergence depth ($d_v$) of object 908 (also the user's gaze point) is determined 810 based on an estimated intersection of gaze lines 906. As shown in FIG. 9, gaze lines 906 converge or intersect at distance $d_v$, where object 908 is located.

Accordingly, referring again to FIG. 8, one of the two optical elements of pancake lens block 604 is adjusted 812 using a varifocal element of varifocal actuation block 606. As described above, an optical element of pancake lens block 604 is adjusted to change the focal length (or power) of VR headset 600 to provide accommodation for the determined vergence depth corresponding to where or what in the displayed portion of the virtual scene the user is looking. In one embodiment, adjusting one of the two optical elements includes changing a distance between back optical element 206 and front optical element 204 from FIG. 2A, for example. In another embodiment, adjusting one of the two optical elements includes applying a force to the larger of the two optical elements (back optical element 206 from FIG. 2A). Alternatively, the shape of both optical elements can be changed simultaneously or a combination of changing at least one of the optical element's shape or changing the distance between the two optical elements is used change the focal length of the pancake lens block.

Figure 10A:
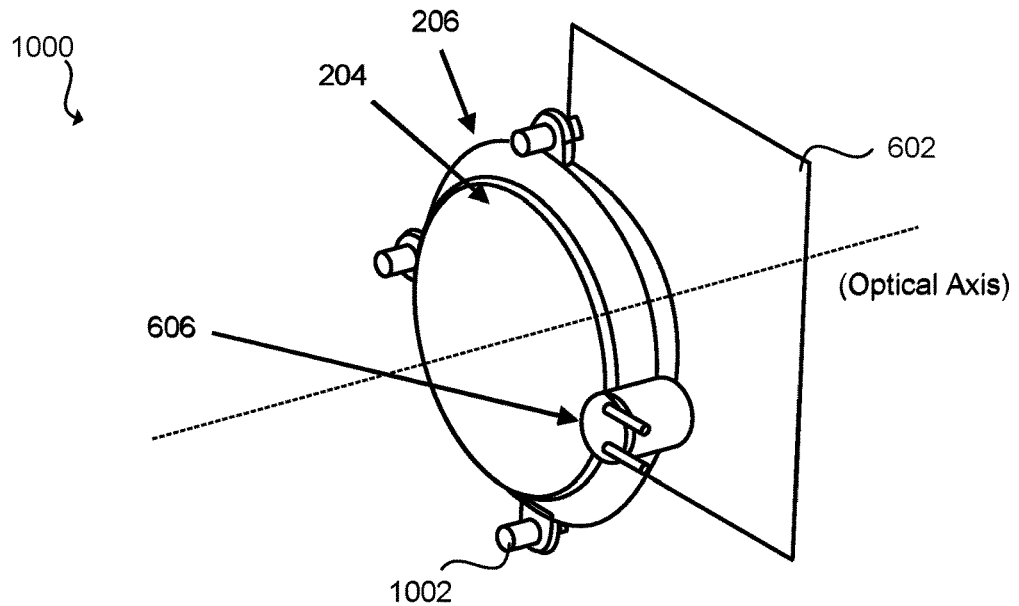
FIGS. 10A and 10B show an example implementation for adjusting the focal length of a pancake lens block that includes two curved optical elements, in accordance with at least one embodiment.
Figure 10B:
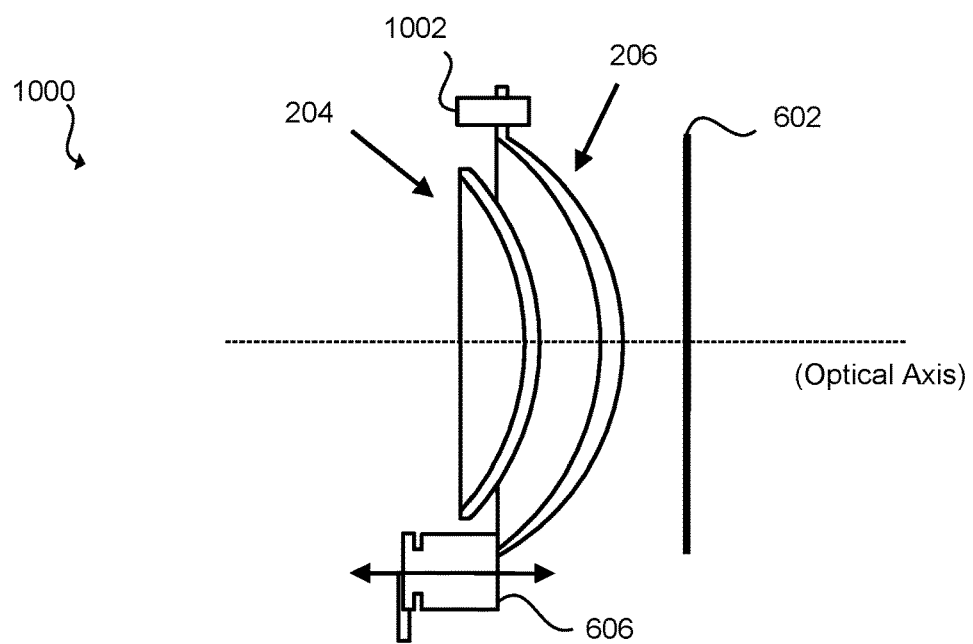

FIGS. 10A and 10B show an example implementation 1000 for adjusting a focal length of pancake lens block 604 by varying the distance between front optical element 204 and back optical element 206 using a varifocal element. In the example, varifocal actuation block 606 includes a voice coil motor capable of providing approximately 3-4 mm of linear travel to move back optical element 206 relative to front optical element 204. Example implementation 1000 may additionally use guide shafts 1002 or some other structural limit to guide the movement of back optical element 206 and prevent tilt. A piezo-electric motor, or some other suitable motor, may in some embodiments be used as an alternative to a voice coil motor in this implementation.

Figure 11A:
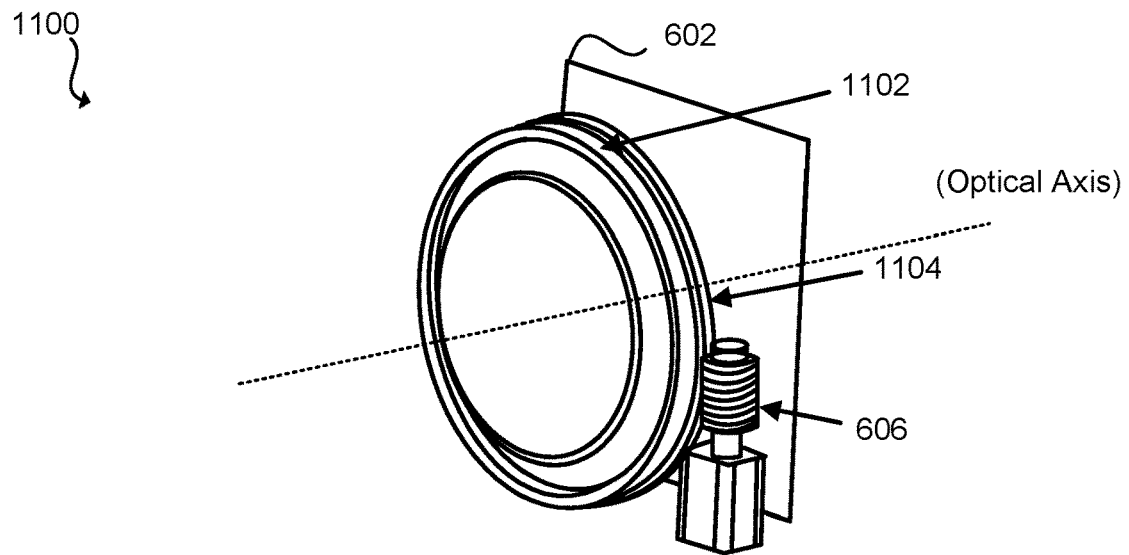
FIGS. 11A and 11B show another example implementation for adjusting the focal length of a pancake lens block that includes two curved optical elements, in accordance with at least one embodiment.
Figure 11B:
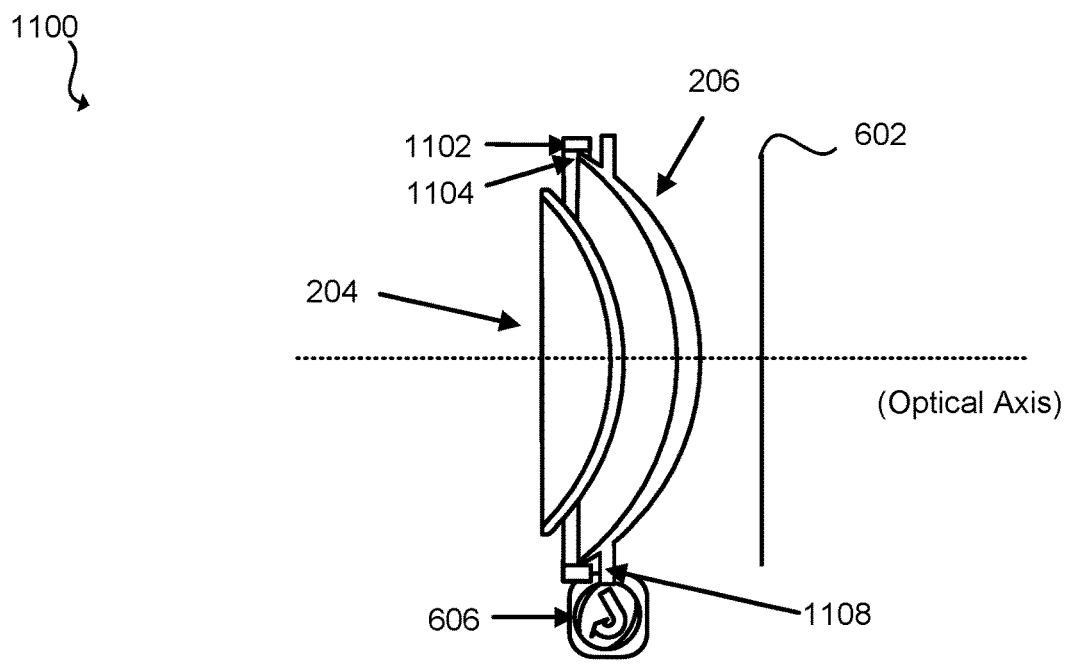

FIGS. 11A and 11B show another example optical element CAM Rotation implementation 1100 for adjusting the focal length of pancake lens block 604 that includes two curved optical elements. In this implementation, back optical element 206 is mounted in stationary housing or threaded collar 1102 and includes a male thread on the outside edge while the inside of threaded collar 1102 includes a female thread. In this example, varifocal actuation block 606 includes a worm-gear drive that, when in operation, rotates the worm gear teeth 1108 that can be either molded to threaded collar 1102 or attached to back optical element 206. The worm gear then rotates back optical element 206 within threaded collar 1102, thereby changing the distance between front optical element 204 and back optical element 206. As discussed above, changing the distance between front optical element 204 and back optical element 206 changes the focal length of pancake lens block 604.

Figure 12A:
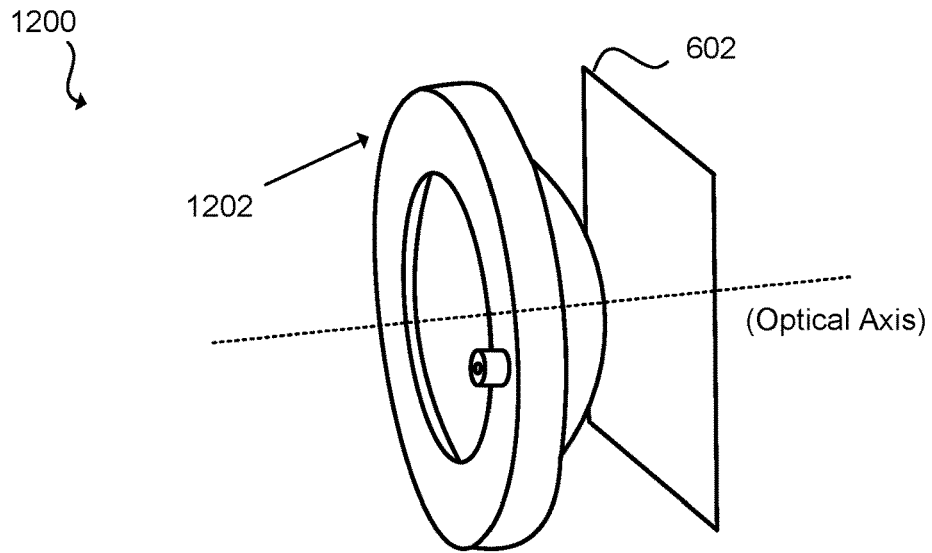
FIGS. 12A and 12B show another example implementation for adjusting the focal length of a pancake lens block that includes two curved optical elements, in accordance with at least one embodiment.
Figure 12B:
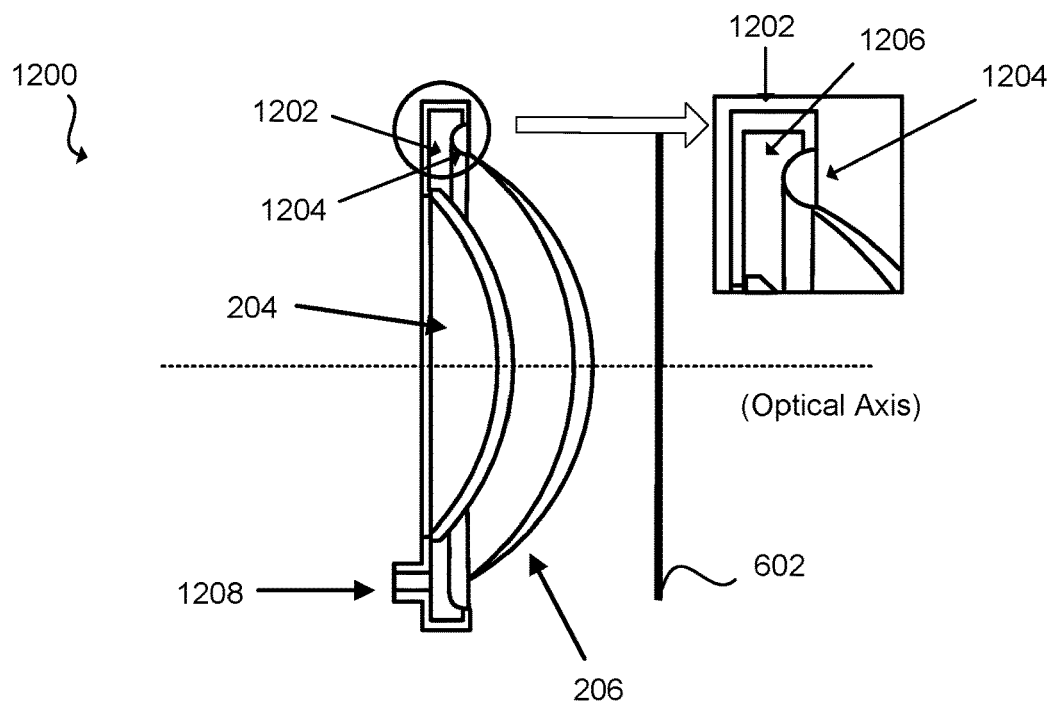

FIGS. 12A and 12B show another example vacuum pressure actuation implementation 1200 for adjusting the focal length of pancake lens block 604 that includes two curved optical elements. In this example, varifocal actuation block 606 includes vacuum housing 1202 and flexible member 1204 (e.g., an EPDM/rubber diaphragm) attached to back optical element 206. Housing 1202 is connected to front optical element 204 and back optical element 206 is connected to housing 1202 by flexible member 1204, creating air-tight chamber 1206 between back optical element 206 and front optical element 204 with the exception of vacuum port 1208. Vacuum port 1208 is connected to a small pump or piston-displacement element. When positive pressure is applied, back optical element 206 moves along the optical axis. Alternatively, although a vacuum application is shown, in this example, an electro-magnetic force could be used in place of the vacuum.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A virtual reality (VR) headset comprising:
at least one processor;
an electronic display screen configured to display a virtual scene to a user wearing the VR headset;
an eye tracking system including at least one image capturing element, the eye tracking system configured to determine an eye position of each eye of the user;
a pancake lens block comprising:
a back curved optical element configured to transmit a portion of light from the electronic display screen; and
a front curved optical element in optical series with the back curved optical element configured to reflect the portion of the light from the electronic display screen transmitted by the back curved optical element back to the back curved optical element, the back curved optical element reflecting a second portion of the light from the front curved optical element back to the front curved optical element for transmission to an exit pupil of the VR headset; and
a varifocal actuation block configured to adjust at least one of the front curved optical element or the back curved optical element to change a focal length of the pancake lens block based at least in part on the determined eye position of each eye of the user.

2. The VR headset of claim 1, wherein the varifocal element adjusts a distance between the front curved optical element and the back curved optical element to change the focal length of the pancake lens block.

3. The VR headset of claim 1, wherein the varifocal element adjusts at least one of the front curved optical element or the back curved optical element to change the focal length of the pancake lens block by:
applying a rotationally symmetric force to an edge of the back curved optical element, the rotationally symmetric force changing the focal length of the pancake lens block by changing a shape of the back curve optical element.

4. The VR headset of claim 1, the pancake lens block further comprises:
a back waveplate of the back curved optical element;
a front waveplate of the front curved optical element; and
a polarized reflector associated with the front curved optical element and configured to (1) transmit light polarized in a direction parallel to a polarization direction of the polarized reflector and (2) reflect light polarized in a direction perpendicular to the polarization direction.

5. The VR headset of claim 4, wherein the portion of the light is polarized in the direction other than the polarization direction of the polarized reflector by at least one of the back waveplate or the front waveplate and reflected back to the back optical element, and wherein the second portion of the light is polarized in the direction parallel to the polarization direction of the polarized reflector by at least one of the back waveplate or the front waveplate and reflected back to the back optical element.

6. The VR headset of claim 1, wherein the determined eye position is used to determine a vergence depth corresponding to where in the virtual scene the user is looking, the varifocal element adjusting at least one of the front curved optical element or the back curved optical element to change the focal length of the pancake lens block for the vergence depth.

7. The VR headset of claim 6, wherein the varifocal element adjusts at least one of the front curved optical element or the back curved optical element to change the focal length of the pancake lens block by:
changing a distance between the back curved optical element and the front curved optical element to adjust a focal length of the pancake lens block to provide focus at the vergence depth.

8. A headset comprising:
at least one processor;
an electronic display screen configured to display a virtual scene;
an eye tracking system configured to determine a vergence depth based at least in part on an eye position of each eye of the user;
a pancake lens block comprising:
a back curved optical element configured to transmit light from the electronic display screen; and
a front curved optical element configured to (1) reflect the light first incident on the front curved optical element from the back curved optical element back to the back curved optical element, the back curved optical element reflecting the light from the front curved optical element back to the front curved optical element, and the front curved optical element configured to (2) transmit the light front incident on the front curved optical element to an exit pupil of the VR headset; and
a varifocal actuation block configured to adjust at least one of the front curved optical element or the back curved optical element to change a focal length of the pancake lens block based at least in part on the vergence depth.

9. The headset of claim 8, wherein the varifocal actuation block provides focus at the vergence depth by:
applying a force to an edge of the back curved optical element, the force changing a radius of curvature of the back curved optical element causing the light to focus in a location corresponding to the vergence depth.

10. The headset of claim 8, wherein the varifocal actuation block provides focus at the vergence depth by:
changing a distance between the back curved optical element and the front curved optical element to adjust a focal length of the pancake lens block to provide focus at the vergence depth.

11. The headset of claim 8, wherein the back curved optical element is partially reflective reflecting a first percentage of the light and transmitting a second percentage of the light at each instance of the light being incident on back curved optical element.

12. The headset of claim 8, wherein the pancake lens block further comprises:
a back waveplate associated with the back curved optical element;
a front waveplate associated with the front curved optical element; and
a polarized reflector associated with the front curved optical element and configured to (1) transmit light polarized in a direction parallel to a polarization direction of the polarized reflector and (2) reflect light polarized in a direction perpendicular to the polarization direction.

13. The headset of claim 12, wherein the light first incident on the front curved optical element is polarized in the direction other than the polarization direction of the polarized reflector by at least one of the back waveplate or the front waveplate and reflected back to the back optical element.

14. The headset of claim 13, wherein the first portion of the light is polarized in the direction parallel to a polarization direction of the polarized reflector by at least one of the back waveplate or the front waveplate and reflected back to the back optical element.

15. A method comprising:
displaying a virtual scene to a user via a virtual reality headset, the virtual reality headset includes a pancake lens block that directs light from a display screen presenting the virtual scene to an exit pupil of the virtual reality headset, the pancake lens block including a back curved optical element in optical series with a front curved optical element;
determining an eye position for each eye of the user via images of each eye of the user captured by an eye tracking system included in the virtual reality headset; and
adjusting the back curved optical element relative to the front curved optical element to change a focal length of the pancake lens block based at least in part on the eye position for each eye of the user.

16. The method of claim 15, further comprising:
determining, using the eye position for each eye of the user, gaze lines for each eye of the user; and
determining a vergence depth for the user based on an estimated intersection of the gaze lines for each eye of the user and the eye position of each eye of the user, the vergence depth corresponding to a location in the virtual scene where the user is looking in the virtual scene.

17. The headset of claim 16, wherein adjusting the back curved optical element relative to the front curved optical element to change the focal length of the pancake lens block includes:
changing a distance between the back curved optical element and the front curved optical element to adjust a focal length of the pancake lens block to provide focus at the vergence depth.

18. The headset of claim 15, wherein adjusting the back curved optical element relative to the front curved optical element to change the focal length of the pancake lens block includes:
applying a force to an edge of the back curved optical element, the force changing a radius of curvature of the back curved optical element causing the light to focus in a location corresponding to the vergence depth.

19. The method of claim 15, wherein the back curved optical element is configured to transmit light from the electronic display to the front curved optical element, the front curved optical element is configured to reflect the light from the electronic display transmitted by the back curved optical element back to the back curved optical element, and the back curved optical element reflects a portion of the light from the electronic display from the front curved optical element back to the front curved optical element for transmission to an exit pupil of the virtual reality headset.

20. The method of claim 15, wherein the pancake lens block includes a back waveplate associated with the back curved optical element and a front waveplate associated with the front curved optical element, and wherein the front curved optical element is a polarized reflector configured to transmit light polarized in a direction parallel to a polarization direction of the polarized reflector and configured to reflect light polarized in a direction other than the polarization direction, and wherein the light first incident on the front curved optical element is polarized in the direction other than the polarization direction of the polarized reflector by at least one of the back waveplate or the front waveplate and reflected back to the back optical element, and wherein the second portion of the light is polarized in the direction parallel to a polarization direction of the polarized reflector by at least one of the back waveplate or the second waveplate and reflected back to the back optical element.

* * * * *

UNITED STATES PATENT AND TRADEMARK OFFICE
CERTIFICATE OF CORRECTION

PATENT NO. : 10,429,647 B2
APPLICATION NO. : 15/179883
DATED : October 1, 2019
INVENTOR(S) : Jacques Gollier et al.

Page 1 of 1

It is certified that error appears in the above-identified patent and that said Letters Patent is hereby corrected as shown below:

In the Claims

Column 17, Line 31, Claim 17, delete "The headset of claim 16" and insert -- The method of claim 16 --.

Column 18, Line 1, Claim 18, delete "The headset of claim 15" and insert -- The method of claim 15 --.

Signed and Sealed this
Fifth Day of May, 2020

Andrei Iancu
*Director of the United States Patent and Trademark Office*